(12) United States Patent
Sundaram

(10) Patent No.: US 11,174,440 B2
(45) Date of Patent: Nov. 16, 2021

(54) INTEGRATED THERMAL AND CATALYTIC CRACKING FOR OLEFIN PRODUCTION

(71) Applicant: LUMMUS TECHNOLOGY LLC, Bloomfield, NJ (US)

(72) Inventor: Kandasamy Meenakshi Sundaram, Old Bridge, NJ (US)

(73) Assignee: LUMMUS TECHNOLOGY LLC, Bloomfield, NJ (US)

( * ) Notice: Subject to any disclaimer, the term of this patent is extended or adjusted under 35 U.S.C. 154(b) by 0 days.

(21) Appl. No.: 16/888,913

(22) Filed: Jun. 1, 2020

(65) Prior Publication Data

US 2020/0291308 A1    Sep. 17, 2020

Related U.S. Application Data

(63) Continuation of application No. 16/039,205, filed on Jul. 18, 2018, now Pat. No. 10,669,492.

(Continued)

(51) Int. Cl.
*C10G 51/06* (2006.01)
*C10G 9/28* (2006.01)
(Continued)

(52) U.S. Cl.
CPC ............... *C10G 51/06* (2013.01); *C10G 9/28* (2013.01); *C10G 11/185* (2013.01); *C10B 53/00* (2013.01);
(Continued)

(58) Field of Classification Search
CPC .......... C10G 9/002; C10G 9/14; C10G 57/00; C10G 2300/1037; C10G 2300/807; C10G 2400/20
See application file for complete search history.

(56) References Cited

U.S. PATENT DOCUMENTS

| 3,360,587 A | 12/1967 | Adams |
| 10,669,492 B2 | 6/2020 | Sundaram |

(Continued)

FOREIGN PATENT DOCUMENTS

| CN | 105439798 A | 3/2016 |
| EP | 3655505 A2 | 5/2020 |

(Continued)

OTHER PUBLICATIONS

Office Action issued in Canadian Application No. 3,069,332, dated Mar. 15, 2021 (3 pages).

(Continued)

*Primary Examiner* — Brian A McCaig
(74) *Attorney, Agent, or Firm* — Osha Bergman Watanabe & Burton LLP

(57) ABSTRACT

Embodiments disclosed herein relate to systems and processes for producing olefins and/or dienes. The processes may include: thermally cracking a hydrocarbon containing feed to produce a cracked hydrocarbon effluent containing a mixture of olefins and paraffins; and catalytically cracking the cracked hydrocarbon effluent to produce a catalytically cracked effluent containing additional olefins and/or dienes. The systems may include a reaction zone for thermally cracking a hydrocarbon containing feed to produce a cracked hydrocarbon effluent containing a mixture of olefins and paraffins; and, a catalytic cracking reaction zone for catalytically cracking the cracked hydrocarbon effluent to produce a catalytically cracked hydrocarbon effluent containing additional olefins and/or dienes.

10 Claims, 2 Drawing Sheets

Related U.S. Application Data

(60) Provisional application No. 62/534,111, filed on Jul. 18, 2017.

(51) Int. Cl.
*C10G 11/18* (2006.01)
*C10B 53/00* (2006.01)
*C10G 11/05* (2006.01)

(52) U.S. Cl.
CPC .......... *C10G 11/05* (2013.01); *C10G 2400/20* (2013.01); *C10G 2400/22* (2013.01)

(56) References Cited

U.S. PATENT DOCUMENTS

| | | |
|---|---|---|
| 2003/0149322 A1 | 8/2003 | Koss et al. |
| 2011/0172477 A1* | 7/2011 | Sekiguchi ............ C10G 11/187 585/400 |
| 2016/0097002 A1 | 4/2016 | Sundaram |
| 2020/0291308 A1 | 9/2020 | Sundaram |

FOREIGN PATENT DOCUMENTS

| | | |
|---|---|---|
| JP | H09-511535 A | 11/1997 |
| JP | 2014-047175 A | 3/2014 |
| RU | 2030446 C1 | 3/1995 |
| WO | 98/056740 A1 | 12/1998 |
| WO | 2010/032609 A1 | 3/2010 |
| WO | 2019/018569 A2 | 1/2019 |

OTHER PUBLICATIONS

Extended European Search Report issued in Application No. 18834752.0, dated Mar. 5, 2021 (8 pages).
Notice of Reasons for Refusal issued in Application No. 2020-502279, dated Feb. 9, 2021 (14 pages).

* cited by examiner

INTEGRATED THERMAL AND CATALYTIC CRACKING FOR OLEFIN PRODUCTION

BACKGROUND

Steam cracking furnaces are typically operated at high conversions to produce primarily ethylene and propylene as the desired products. Thermal cracking is a non-selective process that depends on hydrocarbon partial pressure, residence time and temperature. The catalytic cracking process is a selective process. However, catalytic cracking cannot can't produce high ethylene yield.

SUMMARY OF THE DISCLOSURE

In one aspect, embodiments disclosed herein relate to a process for producing olefins and/or dienes. The process may include: thermally cracking a hydrocarbon containing feed to produce a cracked hydrocarbon effluent containing a mixture of olefins and paraffins; and catalytically cracking the cracked hydrocarbon effluent to produce a catalytically cracked effluent containing additional olefins and/or dienes.

In another aspect, embodiments disclosed herein relate to a system for producing olefins and/or dienes. The system may include: a reaction zone for thermally cracking a hydrocarbon containing feed to produce a cracked hydrocarbon effluent containing a mixture of olefins and paraffins; and, a catalytic cracking reaction zone for catalytically cracking the cracked hydrocarbon effluent to produce a catalytically cracked hydrocarbon effluent containing additional olefins and/or dienes.

In one aspect, embodiments disclosed herein relate to a process for producing olefins and/or dienes. The process may include heating a hydrocarbon feedstock, including one or more hydrocarbons, in a convection zone of a pyrolysis reactor to form a heated hydrocarbon mixture. The heated hydrocarbon mixture may be mixed with steam to form a mixed feedstock having a steam to hydrocarbon ratio in the range from 0.04 to 0.2. The mixed feedstock may be heated in the convection zone of the pyrolysis reactor, and then the mixed feedstock may be reacted in the radiant zone of the pyrolysis reactor to convert a portion of the hydrocarbons to produce a cracked hydrocarbon effluent containing a mixture of olefins and paraffins. The entirety of the cracked hydrocarbon effluent may then be fed to a catalytic cracking reaction zone for catalytically cracking the cracked hydrocarbon effluent to produce a catalytically cracked hydrocarbon effluent containing additional olefins and/or dienes. The resulting catalytically cracked hydrocarbon effluent may be separated to recover one or more fractions selected from a hydrogen fraction, a methane fraction, a C2 fraction, an ethylene fraction, an ethane fraction, a C3 fraction, a propylene fraction, a propane fraction, a C4 fraction, a butadiene fraction, a butene fraction, a butane fraction, and a C5+ containing fraction.

Other aspects and advantages will be apparent from the following description and the appended claims.

DETAILED DESCRIPTION

Figure 1:
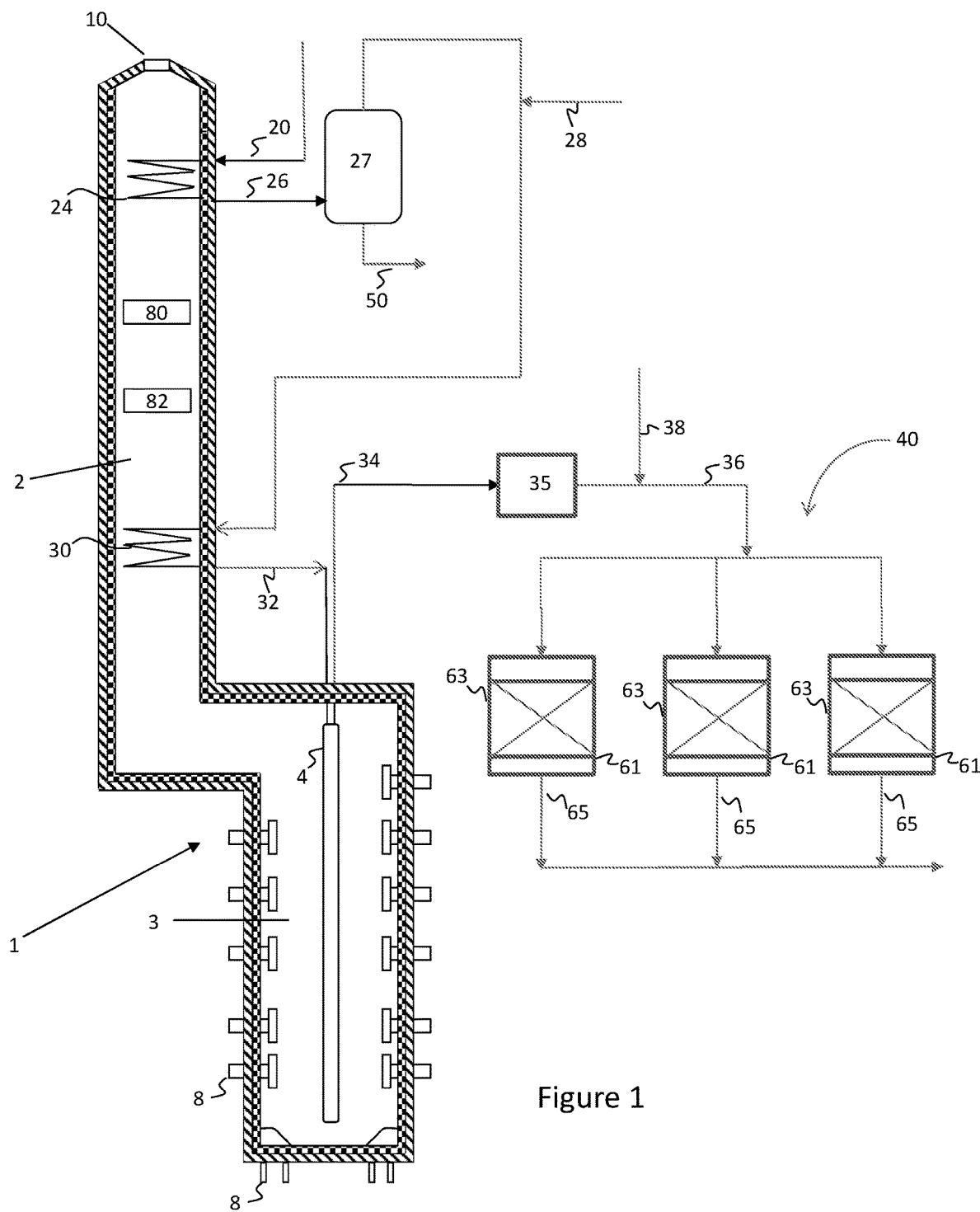
FIG. 1 is a simplified process flow diagram illustrating an integrated pyrolysis-catalytic cracking system for producing olefins from hydrocarbon mixtures according to embodiments herein.

Embodiments disclosed herein relate generally to integrated processes for the pyrolysis and catalytic cracking of hydrocarbon mixtures to produce olefins. More specifically, embodiments herein provide a process for limited thermal conversion of a hydrocarbon feedstock followed by catalytic cracking.

Over-conversion and coking are common obstacles to using both thermal and catalytic cracking. Embodiments herein overcome these barriers, resulting in improved selectivity, greater yields, lower energy consumption in a system that is also lower capital cost than the separate systems. The thermal cracking reactor of embodiments herein is very simplified compared to the conventional steam cracking reactor; operates at different temperatures and pressure; and has different heat transfer properties resulting in elimination/minimization of detrimental coke at a much lower capital cost. The effluent from the reactor is a better feedstock for catalytic cracking than conventional feeds as the composition has been changed to react faster with less energy input and higher yields of target products. This will also enable a catalytic cracking reactor to process more feed and produce more product from a given size reactor system. The combination of a thermal cracking reactor and catalytic cracking reactor according to embodiments herein can also be used to process various hydrocarbon feeds, including those heavier than C2 to C5 paraffins, such as naphtha.

The thermal non-catalytic pyrolysis reactor can be used according to embodiments herein to pre-treat the hydrocarbon feed by thermally processing the hydrocarbon feed at ultra-low conversion to prepare a feed that is more converted in the catalytic reactor at lower energy. The feed composition to the catalytic cracking reactor is changed such that the feed will produce higher levels of targeted products.

In the pyrolysis reactor, a hydrocarbon feed is preheated in the convection section, mixed with dilution steam and then sent to the radiant section. Very low cracking severity is maintained in the pyrolysis heater. This will thermally crack the hydrocarbons to mainly primary (large) olefins and some light olefins like ethylene and propylene.

Secondary cracking is reduced to a minimum level. The products are sent to the catalytic cracker reaction to catalytically crack to light olefins. This improves the propylene production and reduces the fuel gas and fuel oil components. It reduces the energy consumption. It produces higher propylene/ethylene ratio in the effluent than pure thermal cracking. When a packed bed is used for catalytic cracking instead of a riser cracker, the products does not contain NOx and/or oxygen and hence product recovery is simplified.

The thermal non-catalytic pyrolysis reactor according to embodiments herein may be described as a pre-reactor to condition the feed to a catalytic cracking reactor. The feed to the catalytic cracking reactor has been pretreated and converted at different temperature/pressure conditions as well as different steam/oil ratios than conventional steam cracking furnaces. This combination results in lower capital and enables the combined reactor system to operate at higher selectivity to produce more total olefins products (ethylene/propylene/butenes/butadiene/C5 olefins).

Any hydrocarbon feed can be used to produce ethylene and propylene according to embodiments herein. For feeds heavier than C3, a higher propylene/ethylene (P:E) ratio can be obtained than that produced in thermal cracking alone. The concept remains the same, but operating conditions may be modified for different feeds.

FIG. 1 illustrates a simplified process flow diagram of an integrated pyrolysis and catalytic cracking system according to embodiments herein. A fired tubular furnace 1 may be used for the thermal cracking of hydrocarbons to ethylene, propylene, butenes, and other olefinic compounds. The fired tubular furnace 1 has a convection section or zone 2 and a cracking section or radiant heating zone 3. The furnace 1 contains one or more process tubes 4 (radiant coils) through which a portion of the hydrocarbons fed through hydrocarbon feed line 20 are thermally cracked to produce product gases upon the application of heat. Radiant and convective heat is supplied by combustion of a heating medium introduced to the cracking section 3 of the furnace 1 through heating medium inlets 8, such as hearth burners, floor burners, or wall burners, and exiting through an exhaust 10.

The hydrocarbon feedstock 20, which may be a single hydrocarbon or a mixture of hydrocarbons, such as C2-C6 hydrocarbons, and/or heavier feeds like naphtha, may be introduced to a heating coil 24, disposed in the convective section 2 of pyrolysis heater 1. In the heating coil 24, the hydrocarbon feedstock may be heated and/or vaporized via convective heat exchange with the exhaust.

Depending upon the boiling range of the hydrocarbon feedstock, the resulting heated hydrocarbon feedstock 25 may be partially or fully vaporized. Feedstocks fully vaporized may then be fed for superheating and cracking. For feedstocks only partially vaporized, the heated hydrocarbon feedstock 25 may be passed through a flash drum 27 to separate the heated hydrocarbon vapors 26 from the liquids 50. Flash drum 27 will be required only for mixtures including heavier hydrocarbons, and will not be used for cracking light feeds such as naphtha and gasoil. The liquids 50 may be processed separately, such as in a second heating/vaporization coil and a second radiant coil to produce additional olefins or may be processed via other hydroconversion processes, to produce higher value end products.

If desired, the heated hydrocarbon feedstock vapors 26 may then be mixed with steam or an inert compound, such as nitrogen, carbon dioxide, or any other inorganic gases. The dilution steam or inert may be supplied to the process via flow line 28. Various portions of the process or additional processes in the plant may use low temperature or saturated steam, while others may use high temperature superheated steam. Steam to be used within the process or elsewhere in the plant may be heated or superheated via a heating coil 80, 82 disposed in the convection zone 2 of pyrolysis heater 1.

The heated hydrocarbon mixture in stream 28 may then be fed to a heating coil 30, which may be disposed at a lower elevation in the pyrolysis heater, and therefore at a higher temperature, than heating coil 24. The resulting superheated mixture may then be fed via flow line 32 to a cracking coil 4 disposed in radiant zone 3 of pyrolysis heater 1, operated at a temperature for partial conversion, via thermal cracking, of the hydrocarbon vapors. The cracked hydrocarbon product may then be recovered via flow line 34.

The cracked hydrocarbon product may then be fed via flow lines 34, 36 to catalytic cracking reaction zone 40. Optionally, additional hydrocarbons 38 may be combined with cracked hydrocarbon product 34 for conversion in the catalytic cracking reaction zone 40. Depending upon the coil 4 outlet temperature, the additional hydrocarbons 38 may be used to cool the cracked effluent to a desired catalytic cracking reaction zone inlet temperature. Alternatively, or additionally, a transfer line exchanger 35 may be used to reduce a temperature of the cracked hydrocarbon product 34 to the desired inlet temperature for the catalytic cracking reaction zone. Where both a direct and indirect exchange are used, these may be placed in any order.

The hydrocarbons in flow line 36 may then be forwarded to catalytic cracking reaction zone 40, which may include one or more catalytic cracking reactors 61 operating in series or in parallel, as illustrated. The catalytic cracking reactors may each contain one or more beds 63 containing a cracking catalyst. A catalytically cracked hydrocarbon effluent may then be recovered from reactors 61 via flow lines 65 and forwarded via flow line 67 to a product recovery and separation zone (not illustrated). While not illustrated, the catalytic cracking reaction zone 40 may also include feed lines and control valves for supplying steam and air for decoking, a quench system for quenching the catalytically cracked effluent 65, as well as flow lines for recovering a decoke effluent from a reactor going through decoking and/or catalyst regeneration.

Catalytic cracking reaction zone 40 may include fixed bed reactors, packed bed reactors, slurry reactors, fluidized bed reactors, or any other type of cracking reactor. As illustrated, the reaction zone 40 may include three fixed bed reactors, which may be operated in a staggered manner. Since the catalyst may deactivate quickly, multiple packed bed reactors may be required. As the severity in thermal cracker is low, the thermal coil reactors may run months before cleaning (decoking) is required. Due to catalyst deactivation, the product distribution will also change with time. To minimize the fluctuations in the product composition, the packed beds will be staggered (in time) between start of cracking and start of decoking. For example, assuming a 4 reactor system, where three are used at any given time for cracking. One reactor is in a decoking cycle. A first reactor will be at near clean conditions (catalyst at initial activity), a second reactor is at 33% activity and a third reactor is at 67% of the activity cycle. The fourth reactor which reached the allowable catalyst activity limit is taken out and is under regeneration. So when the $4^{th}$ reactor is clean, it will take the place of first reactor and the 1st reactor will take the role of the 2nd reactor and the 2nd reactor will take the role of old 3rd reactor and old 3rd reactor will be decoked. This cycle repeats. When the cycle is not synchronized, additional spare reactors may be required. A similar configuration may be used with the illustrated 3-reactor system, where one is decoking, the other two at 0% and 50% of the activity cycle, respectively. Other cyclic configurations may be used for reaction zones having greater or fewer number of reactors.

Figure 2:
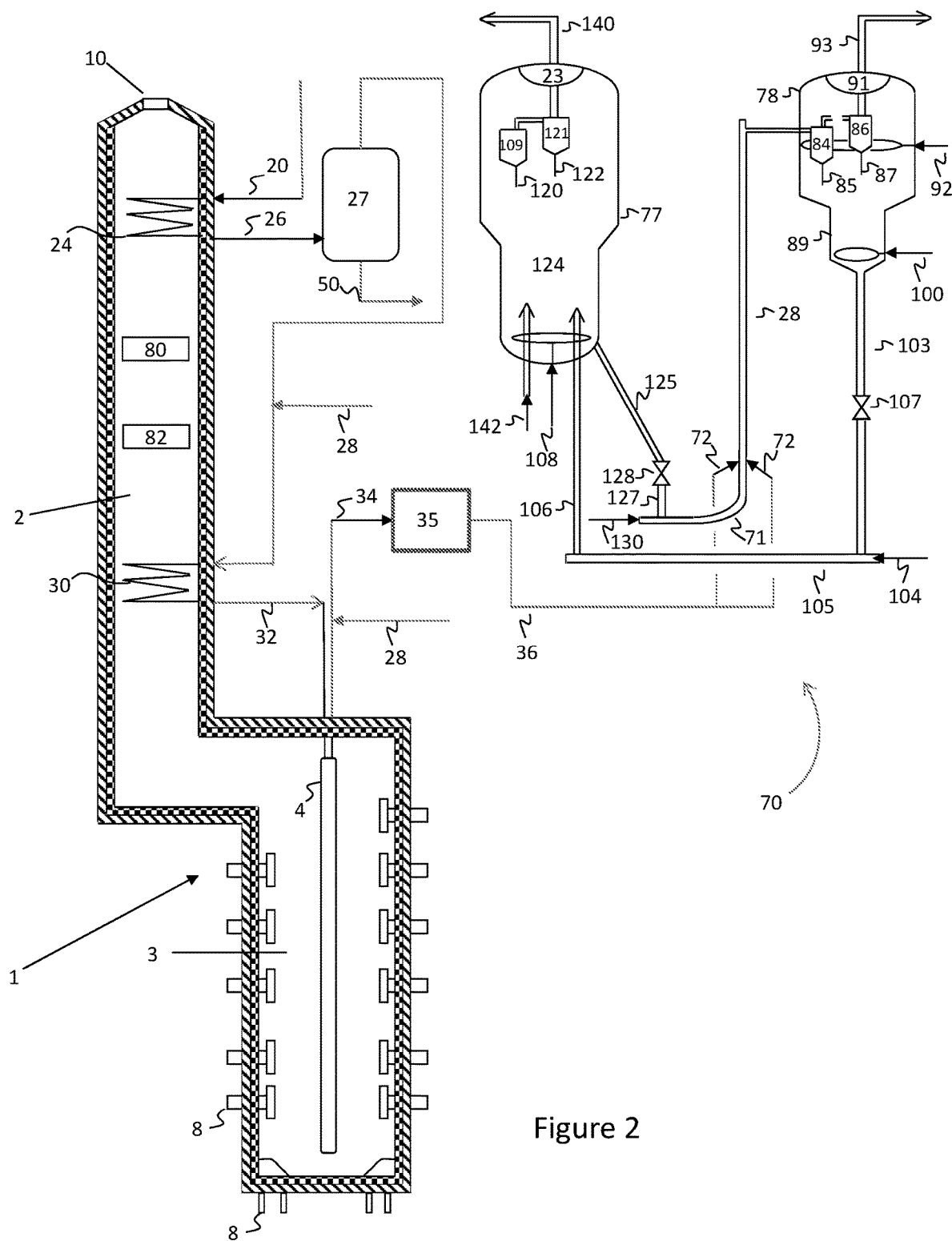
FIG. 2 is a simplified process flow diagram illustrating an integrated pyrolysis-catalytic cracking system for producing olefins from hydrocarbon mixtures according to embodiments herein.

FIG. 2 illustrates a simplified process flow diagram of an integrated pyrolysis and catalytic cracking system according to embodiments herein, where like numerals represent like parts. A fired tubular furnace 1 may be used for the thermal cracking of hydrocarbons to ethylene, propylene, butenes, and other olefinic compounds. The fired tubular furnace 1 has a convection section or zone 2 and a cracking section or radiant heating zone 3. The furnace 1 contains one or more process tubes 4 (radiant coils) through which a portion of the hydrocarbons fed through hydrocarbon feed line 20 are thermally cracked to produce product gases upon the application of heat. Radiant and convective heat is supplied by combustion of a heating medium introduced to the cracking section 3 of the furnace 1 through heating medium inlets 8, such as hearth burners, floor burners, or wall burners, and exiting through an exhaust 10.

The hydrocarbon feedstock 20, which may be a single hydrocarbon or a mixture of hydrocarbons, such as C2-C6 hydrocarbons, may be introduced to a heating coil 24, disposed in the convective section 2 of pyrolysis heater 1. In the heating coil 24, the hydrocarbon feedstock may be heated and/or vaporized via convective heat exchange with the exhaust.

Depending upon the boiling range of the hydrocarbon feedstock, the resulting heated hydrocarbon feedstock 25 may be partially or fully vaporized. Feedstocks fully vaporized may then be fed for superheating and cracking. For feedstocks only partially vaporized, the heated hydrocarbon feedstock 25 may be passed through a flash drum 27 to separate the heated hydrocarbon vapors 26 from the liquids 50. The liquids 50 may be processed separately, such as in a second heating/vaporization coil and a second radiant coil to produce additional olefins or may be processed via other hydroconversion processes, to produce higher value end products.

If desired, the heated hydrocarbon feedstock vapors 26 may then be mixed with steam or an inert compound, such as nitrogen, carbon dioxide, or any other inorganic gases. The dilution steam or inert may be supplied to the process via flow line 28. Various portions of the process or additional processes in the plant may use low temperature or saturated steam, while others may use high temperature superheated steam. Steam to be used within the process or elsewhere in the plant may be heated or superheated via a heating coil 80, 82 disposed in the convection zone 2 of pyrolysis heater 1.

The heated hydrocarbon mixture in stream 28 may then be fed to a heating coil 30, which may be disposed at a lower elevation in the pyrolysis heater, and therefore at a higher temperature, than heating coil 24. The resulting superheated mixture may then be fed via flow line 32 to a cracking coil 4 disposed in radiant zone 3 of pyrolysis heater 1, operated at a temperature for partial conversion, via thermal cracking, of the hydrocarbon vapors. The cracked hydrocarbon product may then be recovered via flow line 34.

The cracked hydrocarbon product may then be fed via flow lines 34, 36 to catalytic cracking reaction zone 40. Optionally, additional hydrocarbons 38 may be combined with cracked hydrocarbon product 34 for conversion in the catalytic cracking reaction zone 40. Depending upon the coil 4 outlet temperature, the additional hydrocarbons 38 may be used to cool the cracked effluent to a desired catalytic cracking reaction zone inlet temperature. Alternatively, or additionally, a transfer line exchanger 35 may be used to reduce a temperature of the cracked hydrocarbon product 34 to the desired flow line 36 inlet temperature for the catalytic cracking reaction zone.

The hydrocarbons in flow line 36 may then be forwarded to catalytic cracking reaction zone 70, which may include a fluidized catalytic cracking (FCC) reactor system. The thermally cracked effluent in flow stream 36 is injected through one or more feed injectors 72 located near the bottom of riser reactor 73. The riser reactor feed contacts hot regenerated catalyst introduced through a J-bend 71. The catalyst, for example, can be a Y-type zeolite based catalyst, which may be used alone or in combination with other catalysts, such as ZSM-5 or ZSM-11.

The heat required for vaporization of the feed and/or raising the temperature of the feed to the desired reactor temperature, such as in the range from 500° C. to about 700° C., and for the endothermic heat (heat of reaction) may be provided by both the hot regenerated catalyst coming from the regenerator 77 as well as the pyrolysis reactor 1. The pressure in riser reactor 73 is typically in the range from about 1 barg to about 5 barg.

After the major part of the catalytic cracking reaction is completed, the mixture of products, unconverted feed vapors, and spent catalyst flow into a two stage cyclone system housed in cyclone containment vessel 78. The two-stage cyclone system includes a primary cyclone 84, for separating spent catalyst from vapors. The spent catalyst is discharged into stripper 89 through primary cyclone dip leg 85. Fine catalyst particles entrained with the separated vapors from primary cyclone 84 are separated in second stage cyclone 86. The catalyst collected is discharged into stripper 89 via dip leg 87. The vapors from second stage cyclone 86 are vented through a secondary cyclone outlet connected to plenum 91, and are then routed to a main fractionator/gas plant (not illustrated) through reactor vapor line 93 for recovery of products, including the desired olefins. If necessary, the product vapors are further cooled by introducing light cycle oil (LCO) or steam via distributor line 92 as a quench media.

The spent catalyst recovered via dip legs 85, 87 undergoes stripping in stripper bed 89 to remove interstitial vapors (the hydrocarbon vapors trapped between catalyst particles) by countercurrent contacting of steam, introduced to the bottom of stripper 89 through a steam distributor 100. The spent catalyst is then transferred to regenerator 77 via the spent catalyst standpipe 103 and lift line 105. Spent catalyst slide valve 107, located on spent catalyst standpipe 103 is used for controlling catalyst flow from stripper 89 to regenerator 77. A small portion of combustion air may be introduced through a distributor 104 to help smooth transfer of spent catalyst.

Coked or spent catalyst is discharged through spent catalyst distributor 106 in the center of the dense regenerator bed 124. Combustion air is introduced by an air distributor 108 located at the bottom of regenerator bed 124. Coke deposited on the catalyst is then burned off in regenerator 77 via reaction with the combustion air. Regenerator 77, for example, may operate at a temperature in the range from about 640° C. to about 750° C. and a pressure in the range from about 1 barg to about 5 barg. The catalyst fines entrained along with flue gas are collected in first stage cyclone 109 and second stage cyclone 121 and are discharged into the regenerator catalyst bed through respective dip legs 120, 122. The flue gas recovered from the outlet of second stage cyclone 121 is directed to flue gas line 140 via regenerator plenum 23 for downstream waste heat recovery and/or power recovery.

A first part of the regenerated catalyst may be withdrawn into a Regenerated Catalyst (RCSP) hopper (not illustrated) via withdrawal line 125, which is in flow communication with regenerator 77 and regenerated catalyst standpipe 127. The catalyst bed in the RCSP hopper may float with regenerator 77 bed level. The regenerated catalyst is then transferred from the hopper to riser reactor 73 via regenerated catalyst standpipe 127, which is in flow communication with J bend 71. The catalyst flow from regenerator 77 to riser reactor 73 may be regulated by a slide valve 128 located on regenerated catalyst standpipe 127. The opening of slide valve 128 is adjusted to control the catalyst flow to maintain a desired top temperature in riser reactor 73.

In addition to lift steam, a provision may also be made to inject feed streams such as C4 olefins and naphtha or similar external streams as a lift media to J bend 71 through a gas distributor 130 located at the Y-section for enabling smooth transfer of regenerated catalyst from J bend 71 to riser reactor 73. J bend 71 may also act as a dense bed reactor for cracking C4 olefins and naphtha streams into light olefins at conditions favorable for such reactions, such as a WHSV of 0.5 to 50 h$^{-1}$, a temperature of 640° C. to 750° C., and residence times from less than 1 to 10 seconds, such as from 1 to 9 seconds or 3 to 8 seconds. The J-bend 71 diameter or size may be optimized to achieve these conditions.

Regenerator 77 may operate in a conventional turbulent flow regime having a superficial gas velocity in the range of 0.5 to 1.2 m/s with a bed density in the range of 400 to 600 kg/m$^3$. As necessary, make-up catalyst may be introduced via one or more flow lines 142. The catalysts employed in the catalytic cracking reactor could be a single catalyst or a combination of Y-type zeolite/FCC catalyst and ZSM-5 or other similar catalysts, such as those mentioned in U.S. Pat. Nos. 5,043,522 and 5,846,402.

As described above, embodiments herein integrate pyrolysis with catalytic cracking. Carrying out the pyrolysis reaction first, with a small amount of steam or without steam, to low conversions, providing an improved feed to a catalytic cracking unit. Various ways of feeding the thermal cracking effluents to catalytic cracker are possible, such as illustrated above with respect to FIGS. 1 and 2.

As another example, naphtha may be chosen as the hydrocarbon processed through the system of FIGS. 1 and 2, although any hydrocarbon can be used.

Naphtha is preheated in the feed preheat coils of a convection section. Then it is mixed with dilution steam. The amount of steam may be zero up to the maximum as limited by the catalytic cracking catalyst properties. The dilution steam may be superheated in the convection section or not. Typical naphtha after mixing with dilution steam is fully vaporized. When very heavy feeds like crude are used, unvaporized feeds may not be sent to further vaporization/superheating, but may be taken out of the convection section. Only the vaporized hydrocarbon plus steam is further superheated in the convection section and then sent to the radiant coil.

The radiant section is operated at a relatively low severity. As the thermal cracking severity is low, any radiant coil design can be used. In fact, a low selective SRT-1 type (serpentine) coil may be advantageous, as it is inexpensive and will have a high capacity per coil. However, any radiant coil can be used. The coil outlet temperatures will be low, typically below 800° C., and the feed conversions will be less than half of the typical conversion values encountered in thermal cracker alone cases. As the cracking catalyst generally can't be exposed to high temperatures, the coil outlet temperature has to be monitored and controlled. If economic decisions dictate higher temperatures, an intermediate transfer line exchanger or direct heat exchange can be used to cool the coil effluent down to a required level. Otherwise the effluent from the thermal cracker (or pyrolysis unit) may be sent to the catalytic cracker without further processing.

In principle, any type of catalytic cracker can be used. In industry, Fluid Catalytic Cracker (FCC) is common. This is a riser cracker. A fluid bed cracker can also be considered. A packed bed reactor can also be used. The catalyst deactivates quickly and hence it has to be regenerated continuously or periodically. FCC uses continuous regeneration. Fixed bed reactors may use periodic regeneration. The catalytic reactor system is explained with a fixed bed operation in this example. However, it is not limited to fixed bed and any type of reactor can be used. Since the catalyst deactivates quickly multiple packed bed reactors are required. Since the severity in thermal cracker is low, it will run months before cleaning (decoking) is required. Due to catalyst deactivation, the product distribution will also change with time. To minimize the fluctuations in the product composition, packed beds may be staggered (in time) between start of cracking and start of decoking. For example, assume a four reactor system, where three reactors are used for cracking with one reactor decoking. The first reactor will be at near clean conditions (catalyst at initial activity), the second reactor at about 33% activity and the third reactor at about 67% of the activity cycle. The fourth reactor, which reached the allowable catalyst activity limit is taken out and is under regeneration. So when the fourth reactor is clean, it will take the place of first reactor and 1st reactor will take the role of old 2nd reactor and old 2nd reactor take the role of old 3rd reactor and old 3rd reactor will be decoked. This cycle repeats. When the cycle is not synchronized, additional spare reactors may be required.

When FCC or fluidized bed is used, there is no cyclic operation. In the FCC approach, all catalyst is sent to a regenerator and recirculated. With a fluid bed reactor, a portion of the catalyst is withdrawn and regenerated and sent back to the fluid bed. In a packed bed, conventional fluid bed, or FCC type of reactor, the space velocity and catalyst circulation and other key parameters may be optimized for the cracking of pyrolysis effluents containing olefins. When a fixed bed reactor is used, it can be placed in a fired heater and/or it can be operated adiabatically. The heat of reaction will dictate the best operating mode and the design. Often, a fired environment is preferred as it is more compact. After the catalytic reactor, the effluents may be quenched and the products recovered.

There are many catalysts commercially available for catalytic cracking. Any suitable catalyst can be used. Typically Zeolite Y with or without additives are used for heavy feeds. ZSM-5 is used for naphtha and lower hydrocarbon feeds. Higher or optimum concentration of ZSM-5 catalyst in the catalyst mix is preferred to meet the desired P/E ratio in the effluents. ZSM-5 selectively converts higher olefins to lower olefins (C3H6 and C4H8). But any catalyst that is good for catalytic cracking can be used.

A typical example is given in Table 1 for naphtha cracking. Once through yield is defined as the yield obtained at the outlet of the reactor. Valuable chemical yield is calculated after hydrogenating acetylene and MAPD and recycling C2, C3 and C4 saturates to a thermal cracking unit to extinction. This represents a potential to make valuable chemicals. Valuable chemicals consist of ethylene, propylene, butadiene, butene, benzene, toluene and C8 aromatics.

TABLE 1

Estimated Product Distribution for Integrated Naphtha Cracking

| Feed Characteristics | | | |
|---|---|---|---|
| Specific Gravity | 0.693 | | |
| Initial Boiling Point | 34° C. | | |
| 50% boiling point | 82.5° C. | | |
| End Boiling Point | 161° C. | | |
| Paraffin Content | 74.4 wt % | | |
| Naphthene Content | 17.1 wt % | | |
| Aromatics Content | 8.5 wt % | | |
| Comparison of Processes | Only Thermal | Only Thermal | Thermal plus Catalytic |
| Severity | Maximum olefin | Maximum Propylene | Thermal very low |
| Once-Through Yields, wt % | | | |
| H2 + CH4 | 15.3 | 12.95 | 11.9 |
| C2H4 | 29.95 | 26.2 | 23.0 |
| C2H6 | 3.25 | 3.5 | 6.0 |

TABLE 1-continued

Estimated Product Distribution for
Integrated Naphtha Cracking

| | | | |
|---|---|---|---|
| C3H6 | 16.25 | 17.0 | 26.0 |
| C3H8 | 0.3 | 0.35 | 3.9 |
| C4s | 10.0 | 12.3 | 9.75 |
| C5-C8 | 19.0 | 23.4 | 16.05 |
| C9+ and others | 5.95 | 4.3 | 3.4 |
| C2H4 + C3H6 | 46.2 | 43.2 | 49.0 |
| Propylene to Ethylene Ratio, w/w | 0.54 | 0.65 | 1.13 |
| % BTX in C5-C8 | 67 | 47 | 64 |
| Valuable Chemical Yield | 72.8 | 70.1 | 75.0 |

When naphtha is thermally cracked alone at maximum olefin mode, the coil outlet temperature is around 840° C., while for maximum propylene mode it will be around 820° C. The coil outlet temperature depends on design. For thermal and catalytic cracking according to embodiments herein, the coil outlet temperature will be below 800° C. and preferably below 750° C. for the thermal reactor, and the catalytic cracking reactor outlet temperature will be below 700° C.

Though naphtha is used in the example, any hydrocarbon can be used. When crude oil is processed, the feed preheat will vaporize only naphtha boiling range. The heavy (unvaporized) can be sent to a refinery for further processing (like FCC or visbreaker etc). Alternatively, it can be sent to pyrolysis fuel oil separation unit. The heavy oil can be separated from the light oil and the light oil alone can be cracked separately in a separate reactor system (thermal followed by catalytic). Or it can be cracked in the catalytic cracker alone. In some embodiments, the heavier components may be fed to the riser reactor downstream of inlet 72 for cracking of the heavier hydrocarbons at lower severity.

All gasoline components (C5–400° F.) range material with or without partial hydrogenation (mainly olefins and very low diolefins) can be sent to BTX extraction (benzene-toluene-xylene extraction) and the raffinate can be sent to a cracking heater system, which may include thermal cracking followed by catalytic cracking or only catalytic cracking.

The heating required can be integrated with fired heaters used for thermal cracking. Thermal and catalytic cracking can be in the same fired heater or in different heaters. Catalytic cracking can be nm adiabatically without a fired heater. This depends upon the feed and type of catalyst. Both the thermal and catalytic reactors will be decoked or catalyst regenerated with a steam/air decoking method. Only the catalytic cracking effluent goes for product recovery. Decoke effluent is vented out. Since catalyst regeneration is separated out with fixed bed processes, there is no NOx or oxygen in the products. So the recovery section is simple. if inlet temperature to the catalytic reactor has to be reduced, fresh feed can be used to moderate the temperature.

As described above, embodiments herein integrate thermal and catalytic cracking. Thermal cracking is a nonselective process which depends on hydrocarbon partial pressure, residence time, and temperature. Catalytic processes are selective, however can't produce high ethylene yield, but can produce high propylene yield. Embodiments herein combining thermal and catalytic cracking in a novel way to produces a high yield of both ethylene and propylene.

While the disclosure includes a limited number of embodiments, those skilled in the art, having benefit of this disclosure, will appreciate that other embodiments may be devised which do not depart from the scope of the present disclosure. Accordingly, the scope should be limited only by the attached claims.

What is claimed:

1. A system for producing olefins and/or dienes, the system comprising:
    a reaction zone configured for thermally cracking a hydrocarbon containing feed comprising C5+ hydrocarbons to produce a cracked hydrocarbon effluent containing a mixture of olefins and paraffins wherein the reaction zone is configured to convert hydrocarbons in the hydrocarbon containing feed in a range from about 20% to less than 40%, on a molar basis;
    a catalytic cracking reaction zone for catalytically cracking the cracked hydrocarbon effluent to produce a catalytically cracked hydrocarbon effluent containing additional olefins and/or dienes; and
    a controller for maintaining the reaction zone at a temperature in the range from 550° C. to 750° C.

2. The system of claim 1, wherein the feed line for transferring the cracked hydrocarbon effluent to the catalytic cracking reaction zone is configured to transfer the cracked hydrocarbon effluent without componential separation.

3. The system of claim 1, wherein the reaction zone for thermally cracking comprises a pyrolysis reactor.

4. The system of claim 1, wherein the catalytic cracking reaction zone comprises a riser reactor.

5. The system of claim 1, wherein the catalytic cracking reaction zone comprises two or more fixed beds in parallel operated in a staggered fashion.

6. The system of claim 1, further comprising a feed line for mixing the hydrocarbon containing feed with one or more of steam, carbon dioxide, or nitrogen.

7. A system for producing olefins and/or dienes, the process comprising:
    a convection zone of a pyrolysis reactor for heating a hydrocarbon feedstock, comprising one or more C5+ hydrocarbons, to form a heated hydrocarbon mixture;
    a mixing unit for mixing the heated hydrocarbon mixture with steam to form a mixed feedstock having a steam to hydrocarbon ratio in the range from 0.04 to 0.2;
    a radiant zone of the pyrolysis reactor for reacting the mixed feedstock to produce a cracked hydrocarbon effluent containing a mixture of olefins and paraffins and to convert 20 mol % to 40 mol % of hydrocarbons in the mixed feedstock;
    a catalytic cracking reaction zone configured for receiving an entirety of the cracked hydrocarbon effluent and for catalytically cracking hydrocarbons in the cracked hydrocarbon effluent to produce a catalytically cracked hydrocarbon effluent containing additional olefins and/or dienes;
    a controller for maintaining the radiant zone at a temperature in the range from 550° C. to 750° C.; and
    a separator for separating the catalytically cracked hydrocarbon effluent to recover one or more fractions selected from a hydrogen fraction, a methane fraction, a C2 fraction, an ethylene fraction, an ethane fraction, a C3 fraction, a propylene fraction, a propane fraction, a C4 fraction, a butadiene fraction, a butene fraction, a butane fraction, and a C5+ containing fraction.

8. The system of claim 7, wherein the catalytic cracking reaction zone comprises a riser reactor.

9. The system of claim 8, further comprising a feed line for feeding a naphtha fraction to the riser reactor.

10. The system of claim 7, wherein the catalytic cracking reaction zone comprises two or more fixed beds in parallel operated in a staggered fashion.

\* \* \* \* \*